Aug. 18, 1942.　　　N. C. HECKMAN　　　2,293,294
FISHING TACKLE
Filed Dec. 11, 1940

Inventor
N. C. Heckman
By Eccleston & Eccleston
Attorneys

Patented Aug. 18, 1942

2,293,294

UNITED STATES PATENT OFFICE 2,293,294

FISHING TACKLE

Norman C. Heckman, Cincinnati, Ohio

Application December 11, 1940, Serial No. 369,641

4 Claims. (Cl. 43—49)

This invention relates to fishing tackle and particularly to the mounting of the float on the fish line.

One of the objects of the invention consists in slidably connecting the float to the line, so that the float may descend to approximately the end of the line for casting purposes and yet which will after the cast, automatically assume a predetermined position with relation to the hook so as to properly position the latter with respect to the bottom of the lake or stream which is being fished.

Another object of the invention consists in providing such an arrangement in which a slight pull by a fish will release the line from the float so as to avoid unduly alarming the fish.

A further object of the invention resides in the provision of a novel construction of latch or detent on the float which latch or detent is adapted to cooperate with a knot or other enlargement on the line to releasably hold the float in proper relation to the fishhook and sinker.

Other objects and advantages of the invention will be apparent from the following description when taken in connection with the accompanying drawing in which.

Figure 1:
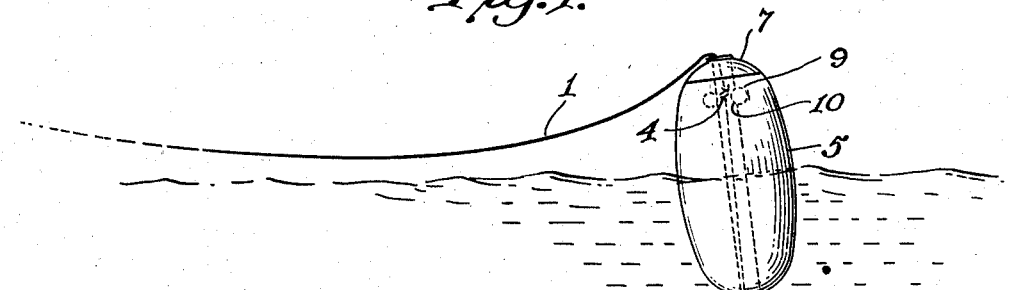
Figure 1 is a perspective view of the new tackle in use.
Figure 2:
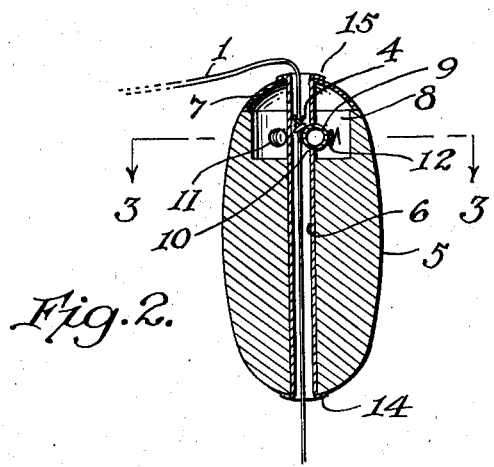
Figure 2 is a longitudinal section through the float and related parts.
Figure 3:
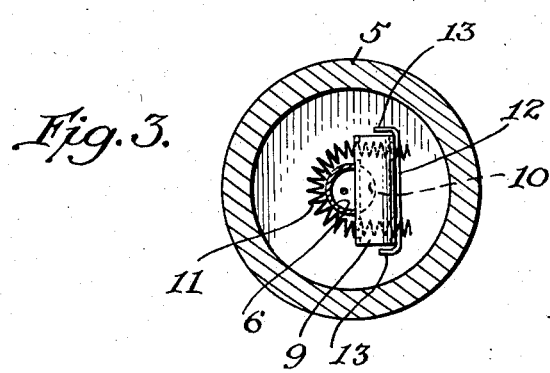
Figure 3 is a horizontal sectional view taken on line 3—3 of Figure 2.

Referring to the drawing in greater detail, the numeral 1 indicates the usual fish line provided with a conventional sinker 2 and fishhook 3.

The fish line 1 is provided with an enlargement 4 at a suitable distance from the sinker 2, this distance depending of course upon the depth of water in the particular locality. The enlargement 4 may be formed by tying a small piece of string on the fish line at the desired point or by forming a knot in the line itself. The former procedure is preferred however as it permits the enlargement to be readily adjusted from one position to another to suit the circumstances.

The float is indicated by numeral 5 and may be formed of any preferred buoyant material. A central passage is formed longitudinally of the float 5 and is preferably provided with a metal or Bakelite tube 6 which serves as a lining for the passage.

In the form of the invention disclosed herein the ends of the float are rounded, the material of the lower end being itself rounded and the upper end being flat but provided with a rounded cap 7 of metal or the like. The upper end of the passage 6 is enlarged as indicated by the numeral 8 to provide a space for the latch or detent which cooperates with the enlargement 4 on the line. In the present embodiment of the invention the detent is in the form of a short tube 9 which is adapted to normally seat in a notched-out portion 10 of the tube. The tube 9 is releasably held in position on its seat by a coil spring 11 which encircles the tube 6 and has its ends passed through transverse openings formed in the member 9. The ends of the spring are secured in position by a bar 12 which is passed transversely through the ends of the spring and has its ends turned down against the ends of the tube 9 as indicated at 13.

The entire assembly including the cap 7 is secured to the float 5 by flanging or spinning over the ends of the tube 6 as indicated by numerals 14 and 15.

The operation of the device will now be described. The enlargement 4 of the fish line is normally positioned above the detent 9 and hence in no way interferes with the movement of the float toward the end of the line when retrieving; this extreme position of the float being highly desirable in the casting operation. The cast having been made, the line will travel through the float until the enlargement engages the detent 9, at which point the fishhook will be at or closely adjacent the bottom of the particular fishing grounds; it being assumed that the enlargement has been properly adjusted with that end in view. Should a fish take the bait and start to run with it the float will descend somewhat thereby giving an adequate signal to the fisherman. Descent of the float below the surface of the water however provides sufficient resistance to cause the enlargement on the line to pass the detent thereby permitting the line to run freely through the float and avoiding any interference with the fish until such time as a short jerk on the rod sets the hook. This action is of considerable importance inasmuch as a fish will frequently release the bait if it is made aware of any resistance such as would be created by a float dragging under and through the water.

From the foregoing description and the accompanying drawing, it will be apparent that I have devised a comparatively simple and inexpensive fishing tackle of the sliding float type; that it facilitates casting by allowing the float to travel to a point adjacent the hook in retrieving; that the float is readily released from the line by a slight pull on the part of the fish thereby avoiding any retardation of the line as the fish travels away with the bait; and that the detent is completely housed within the float thus minimizing the liability of damage thereto, and providing a float having the appearance of a conventional float.

In accordance with the patent statutes I have described what I now believe to be the preferred form of the invention but obviously changes may be made in the details of construction without departing from the spirit of the invention; and it is intended that such changes be included within the scope of the appended claims.

What is claimed is:

1. A float for fish lines, said float provided with a central passage, a tube in said passage, said tube provided with a notch in its side, a detent member mounted in the notch, a coil spring encircling the exterior of the tube, and means for connecting the ends of the spring with the ends of said member.

2. A float for fish lines, said float provided with a central passage, a tube in said passage, said tube provided with a notch in its side, a detent member mounted in the notch and extending transversely of the tube, said member provided with transverse apertures, and a coil spring encircling the tube and having its ends positioned in said apertures.

3. A float for fish lines, said float provided with a central passage, a tube in said passage, said tube provided with a notch in its side, a detent member mounted in the notch and extending transversely of the tube, said member provided with transverse apertures, a coil spring encircling the tube and having its ends positioned in said apertures, and a bar having portions extending through the ends of the spring, the ends of the bar being bent down against the ends of the detent member.

4. A float for fish lines, said float provided with a central passage, a tube in said passage, said tube provided with a rounded notch in its side, a tubular detent member mounted in the notch and extending transversely of the tube, and a spring for normally maintaining the tubular member against the walls of the notch.

NORMAN C. HECKMAN.